US012651892B1

(12) United States Patent
Casey

(10) Patent No.: US 12,651,892 B1
(45) Date of Patent: Jun. 9, 2026

(54) SYSTEM AND METHOD OF INSTALLING COMMUNICATION CABLES USING RODDER END ATTACHMENTS

(71) Applicant: Fibersolver, LLC, Clarksville, TN (US)

(72) Inventor: Kevin Casey, Clarksville, TN (US)

(73) Assignee: Fibersolver, LLC, Clarksville, TN (US)

( * ) Notice: Subject to any disclaimer, the term of this patent is extended or adjusted under 35 U.S.C. 154(b) by 666 days.

(21) Appl. No.: 18/113,899

(22) Filed: Feb. 24, 2023

Related U.S. Application Data

(60) Provisional application No. 63/314,786, filed on Feb. 28, 2022.

(51) Int. Cl.
*H02G 1/08* (2006.01)
*H02G 3/04* (2006.01)
*H02G 3/06* (2006.01)
*H02G 9/06* (2006.01)

(52) U.S. Cl.
CPC ........... *H02G 3/0616* (2013.01); *H02G 1/081* (2013.01); *H02G 3/0418* (2013.01); *H02G 9/06* (2013.01)

(58) Field of Classification Search
CPC .... H02G 3/0616; H02G 1/081; H02G 3/0418; H02G 9/06
See application file for complete search history.

(56) References Cited

U.S. PATENT DOCUMENTS

| | | | | |
|---|---|---|---|---|
| 6,536,463 | B1 * | 3/2003 | Beals ........................ | F16L 7/00 |
| | | | | 405/184 |
| 9,684,144 | B2 * | 6/2017 | Ott ........................ | G02B 6/4457 |
| 12,085,774 | B2 * | 9/2024 | Buddington ......... | G02B 6/4458 |
| 2012/0080650 | A1 * | 4/2012 | Davidson .............. | H02G 1/081 |
| | | | | 29/525.08 |

* cited by examiner

*Primary Examiner* — Sung H Pak
(74) *Attorney, Agent, or Firm* — Spencer Fane LLP; Steven J. Laureanti

(57) ABSTRACT

Methods are disclosed for installing a communication cable in a high voltage conduit containing energized high voltage cables. A method includes inserting a duct rodder through a duct funnel into the high voltage conduit, pushing the duct rodder towards a second location, in response to the duct rodder being impeded in the high voltage conduit, attaching a loop attachment to the duct rodder, reinserting the duct rodder, inserting a second duct rodder having a hook attachment into the opposite end of the high voltage conduit to engage the loop attachment of the duct rodder, pulling the duct rodder through the high voltage conduit, attaching a communication cable to the duct rodder at the second location; and pulling the communication cable to the first location by retracting the duct rodder. Embodiments also include using a flexible rodder attachment for the duct rodder to overcome an impedance in the high voltage conduit.

10 Claims, 21 Drawing Sheets

SLOPE FINAL GRADE TO TOP OF BOX PAD ALL SIDES

FINAL GRADE

200

202

220

204

210

230

702

700

SYSTEM AND METHOD OF INSTALLING COMMUNICATION CABLES USING RODDER END ATTACHMENTS

CROSS REFERENCE TO RELATED APPLICATION

The present disclosure is related to that disclosed in the U.S. Provisional Application No. 63/314,786, filed Feb. 28, 2022, entitled "System and Method of Installing Communication Cables." U.S. Provisional Application No. 63/314, 786 is assigned to the assignee of the present application. The present invention hereby claims priority under 35 U.S.C. § 119 (e) to U.S. Provisional Application No. 63/314, 786.

TECHNICAL FIELD

The present disclosure relates generally to the installation of communication cables and more particularly to the installation of fiber optic cables in a subdivision.

BACKGROUND

Installing new communication cables underground, such as for example fiber optic broadband cable, typically involves excavating earth materials in order to create a pathway for the cable. Existing methods of cable installation use excavation equipment such as directional boring machines to excavate the earth materials. However, the use of directional boring machines and other excavation equipment presents several problems. For example, existing excavation equipment may rupture or otherwise damage existing utility lines, such as water pipes or sewer pipes, and may also cause significant property damage, such as destroying or otherwise damaging concrete driveways or other property installations. When installing communication cables over a wide area, such as a housing subdivision, such destruction may quickly add up to significant repair costs possibly outweighing the potential value of the new communication cables themselves in some cases. Therefore existing methods of installing communication cables are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
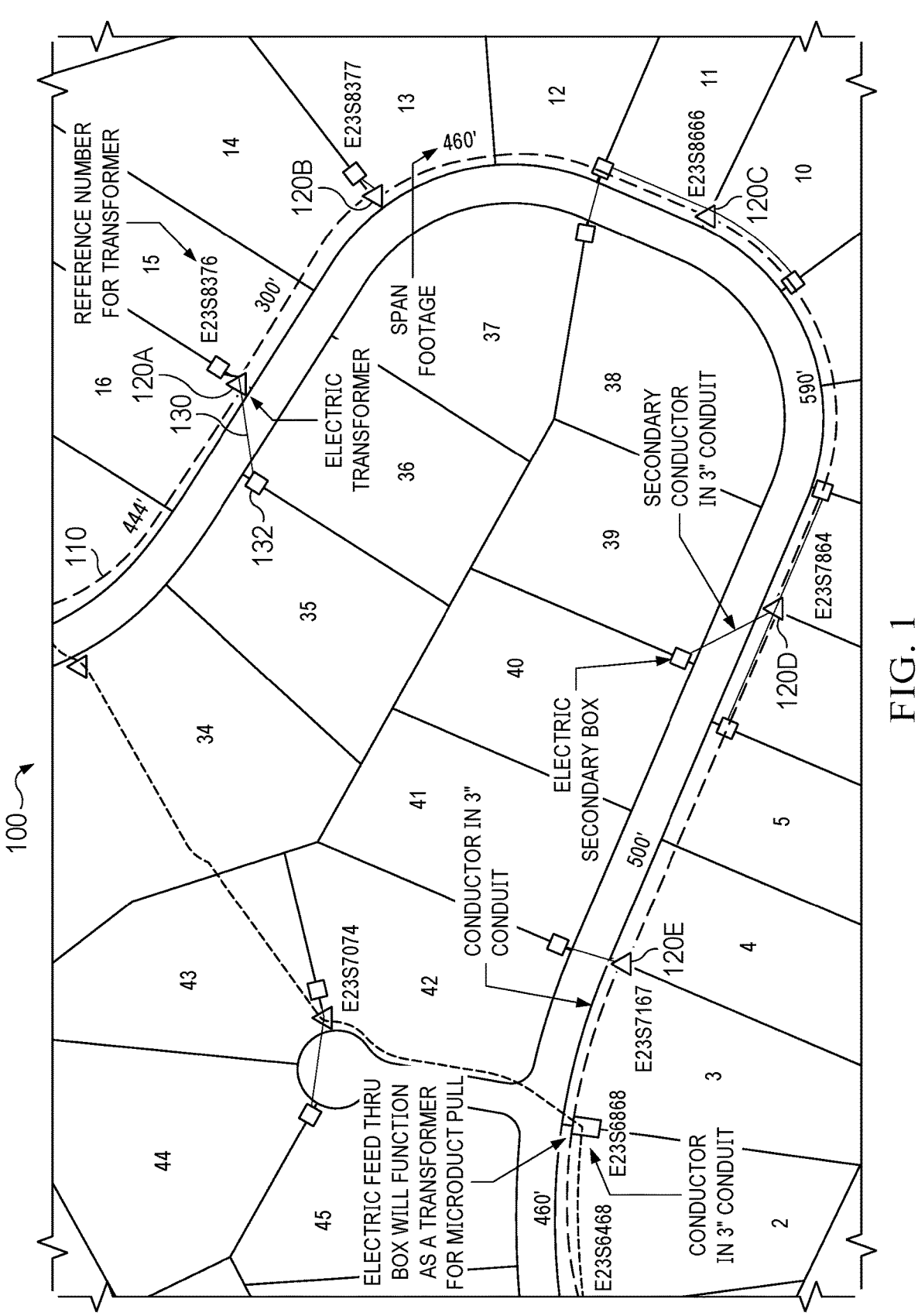
FIG. 1 illustrates a map of an exemplary subdivision, according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Embodiments of the following disclosure provide methods for the installation of communication cables, such as fiber optic cable, using existing high voltage conduits such as those used to provide electricity to homes, linked by transformer boxes. One example method starts by identifying two consecutive transformers of a high voltage system, such as by using a subdivision map, to connect using a fiber optic cable. The first transformer is opened and a duct funnel is inserted into a high voltage conduit running to the second transformer. Then, a fiberglass rodder, or other suitable implement, is run down the duct funnel and through the high voltage conduit to the second transformer. Upon emerging from the high voltage conduit at the second transformer, the end of the fiberglass rodder is attached to a length of fiber optic cable the length of the footage between the two transformers. Then, the rodder is pulled back through the high voltage conduit, bringing the fiber optic cable through the high voltage conduit as well. This process may be repeated several times with different transformers in order to create a fiber optic network along the same pathways as the high voltage ducts.

Use of embodiments of this disclosure enable the setting of fiber optic cable lines throughout areas with existing high voltage infrastructure, such as new or existing housing subdivisions. The embodiments provide safe and reliable methods that avoid the potential destruction that may be caused by excavation equipment. The embodiments also minimize disruption to residents where fiber optic cable is installed as the process may be completed more quickly when compared to existing methods.

The use of high voltage conduits has traditionally been avoided due in part to the danger associated with high voltage. However, this disclosure provides safe methods of utilizing high voltage conduits without causing damage to the existing high voltage cables. Further, the embodiments can be performed while the high voltage cables are energized, preventing any outages for those using receiving electricity through the high voltage cables. Additionally, because high voltage conduits are typically buried at great depth for safety reasons, by placing the fiber optic cable within the high voltage conduit the fiber optic cable itself is unlikely to itself be disturbed or damaged by excavation equipment used in the future.

FIG. 1 illustrates map 100 of an exemplary subdivision, according to an embodiment. Map 100 shows, in dotted line, pathway 110 of high voltage conduits connecting transformer boxes 120, represented by black triangles. Between each transformer box 120 along pathway is shown a footage. For example, as shown, between transformer E23S7864 120D and transformer E23S8666 120C is a span of 590 feet. Also shown on map 100 in green are secondary electrical lines 130 running from transformer boxes 120 to electrical secondary boxes 132, shown as squares. Both the high voltage, or "primary" conduits and the secondary conduits are in this example three inch diameter piping.

Map 100 shows the layout of existing electrical infrastructure in a subdivision. High voltage cables pass through the primary three inch conduits, bringing electricity throughout the subdivision. Transformer boxes 120 have both primary high voltage connections and lower voltage secondary connections. The secondary connections carry electricity at lower voltages to, for example, residential homes. As shown in map 100, existing electrical, and in particular high voltage, infrastructure can provide a network of conduit piping throughout a subdivision. This network of conduits can be utilized to similarly distribute fiber optic cables throughout the subdivision, as described in more detail below.

Figure 2A:
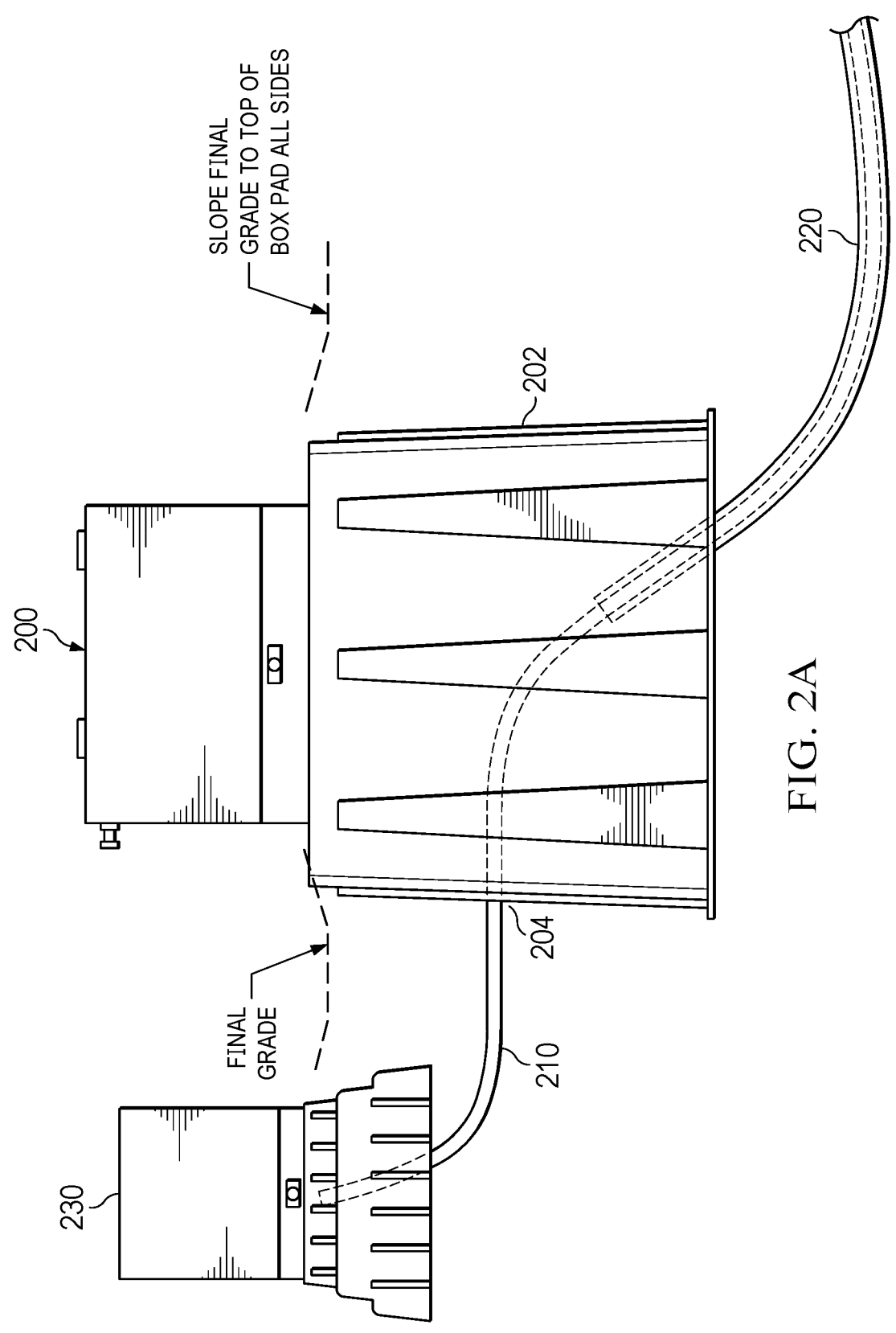
FIGS. 2A and 2B illustrate an exemplary transformer and fiber pedestal, according to an embodiment.
Figure 2B:
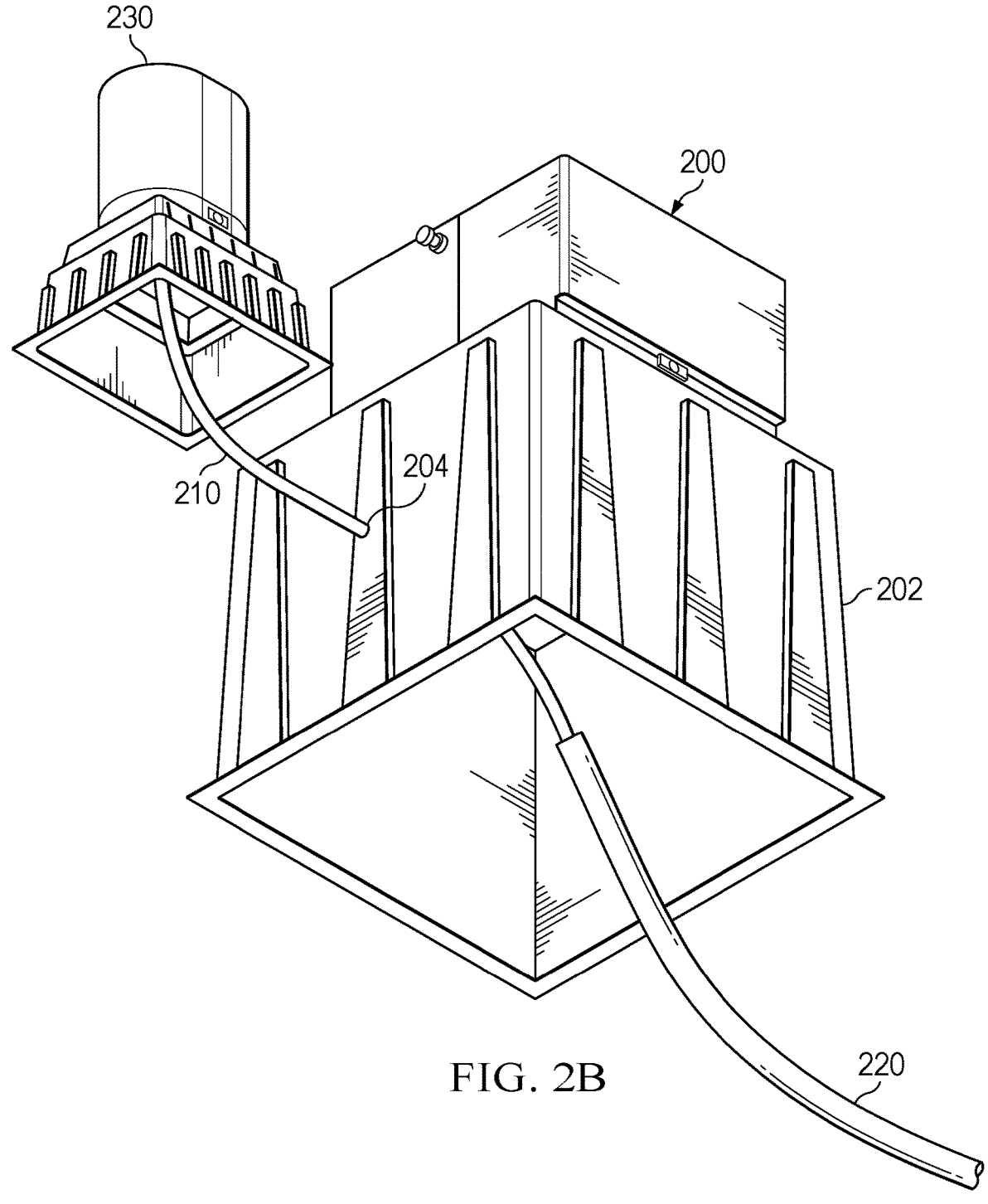

FIGS. 2A and 2B illustrates exemplary transformer 200 and fiber pedestal 230, according to an embodiment. Transformer 200 sits upon transformer vaultpad 202, which is typically underground, with only transformer 200 itself above ground. Fiber pedestal 230 is located approximately 18 inches away from transformer 200, and is used as a secondary box to carry fiber optic connections to residences.

When using embodiments described in further detail below, a fiber optic cable may be delivered to transformer vaultpad 202 in fiber conduit 210 through existing power conduit 220, which may be a high voltage conduit. In embodiments, fiber conduit 210 may be a micro duct conduit. In further embodiments as described in further detail below, a fiber optic cable may be run through power conduit 220 as fiber only, without a fiber conduit. In this example, fiber conduit 210 may from power conduit 220 be laid to fiber pedestal 230, typically at a depth of 12 inches. In order to do so, it may be necessary to drill or otherwise create hole 204 in one wall of transformer vaultpad 202 and thread the fiber optic cable through resulting hole 204. Upon customer signup to fiber optic service, a further line may be run from the fiber connection ending at fiber pedestal 230 to the residence of the customer.

Figure 3:
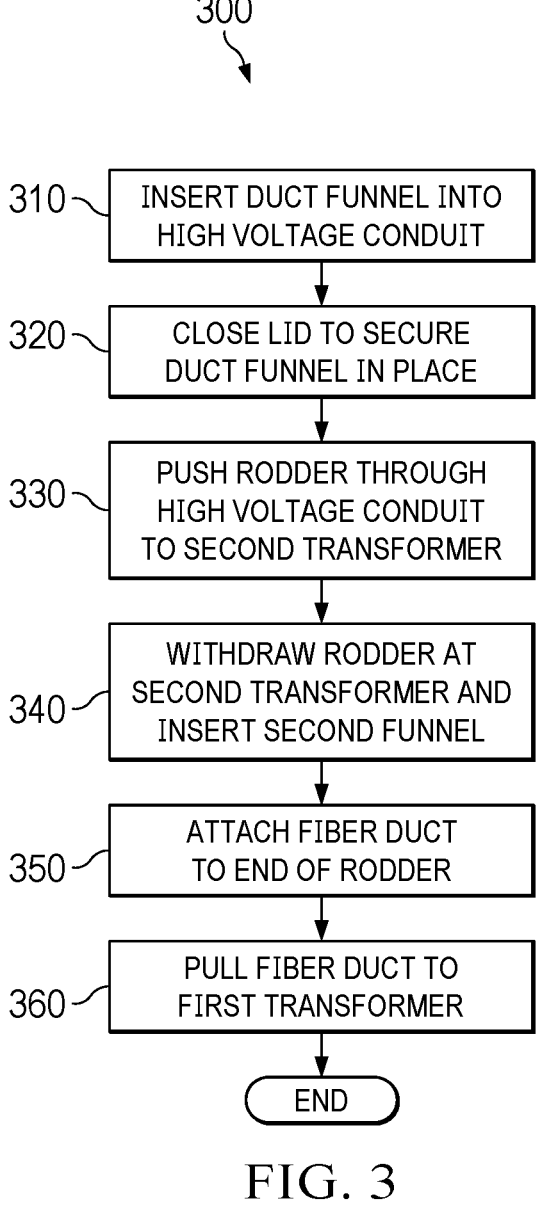
FIG. 3 illustrates an exemplary method for installing a fiber optic cable using a high voltage conduit, according to an embodiment.

FIG. 3 illustrates exemplary method 300 for installing a fiber optic cable using a high voltage conduit, according to an embodiment. Method 300 proceeds by one or more actions, which although described in a particular order, may be performed in one or more permutations, according to particular needs.

At first action 310, a duct funnel is inserted into a high voltage conduit of a first transformer. In particular, two high voltage conduits may be present opening from the ground located within a transformer vaultpad. Typically, one conduit runs from the first transformer to a "previous" transformer while the other conduit runs from the first transformer to a "next" or second transformer, although the final transformer in a line may have only a single high voltage conduit as there is not "next" transformer in line. The duct funnel is a movable length of conduit. In embodiments, the duct funnel may be a length of one inch rolled conduit modified to have a slightly larger opening at either end. As described in further detail below, the duct funnel is used to safely insert and remove ducts, cables, rodders or other tools from the high voltage conduit.

At second action 320, the lid of the transformer is closed, to secure the duct funnel in place, and allowing work with the fiber cable to continue without the risk of direct contact with the high voltages within the transformer itself. In other embodiments, the duct funnel may be further secured using, for example, a vise grip or a locking wrench, though in many circumstances the weight of the transformer lid itself may be sufficient to hold the duct funnel in place, and ensure the end of the duct funnel does not leave the high voltage conduit.

At third action 330, one end of a rodder is inserted into the duct funnel and therefrom pushed through the high voltage conduit. For the purposes of this disclosure, a rodder, also called a duct rodder or a conduit rodder, is a tool for laying cables in pipelines, and can also collect cables. The rodder may be any diameter less than the diameter of the duct funnel. For example, if the duct funnel is a one inch diameter conduit, a half inch rodder may be used. In this example, the high voltage conduit used runs from the first transformer to a second transformer, so the fiberglass rodder similarly is put into the high voltage conduit, via the duct funnel, and pushed until reaching the second transformer. The rodder may be inserted into the duct funnel manually, that is, by inserting the rodder by hand into the duct funnel and then into the high voltage conduit. In other embodiments, the rodder may be inserted into the duct funnel by use of a machine that mechanically inserts the rodder through into the duct funnel.

At fourth action 340, the rodder is withdrawn from the high voltage conduit at the second transformer, and a second duct funnel is inserted over the rodder and into the high voltage conduit. The second duct funnel may be used to allow work on the fiber optic cable to proceed without risk of contact with the second transformer, as well as ensuring that the fiber optic cable correctly enters the high voltage conduit.

At fifth action 350, the end of the rodder coming through at the second transformer is attached to an end of a length of fiber optic micro duct. Fiber optic micro duct refers to a length of fiber optic cable encased in a conduit or duct, in order to protect the fiber optic cable. However, in other embodiments, rather than a fiber optic micro duct being attached to the rodder and pulled through the high voltage conduit, only the fiber optic cable on its own may be attached to the rodder and pulled through the high voltage conduit. Such embodiments may save on use of ducts or conduits as less is needed for encasing the fiber optic cable. As used throughout, the phrase "fiber optic micro duct" includes both fiber optic cable within an outer duct and fiber optic cable without such an outer duct.

In some embodiments, the fiber optic micro duct may be previously prepared according to a known length between the transformers. That is, the fiber optic micro duct may be the length of the distance between the two transformers plus some additional length to allow for the fiber optic micro duct to be run from the transformers to secondary boxes. Various methods may be used to attach the rodder to the fiber optic micro duct, including kellem grips or missile head connectors. The connection used may be further strengthened, for, by example, tying the fiber optic micro duct to the rodder or taping the fiber optic micro duct to the rodder.

At sixth action 360, the rodder is pulled back through the high voltage conduit from the second transformer, which in turn pulls the attached fiber optic micro duct to the first transformer. Various methods may be used to pull the rodder back to the first transformer, including manually pulling the rodder, turning a coiling wheel of the rodder or placing the rodder base on a motor vehicle and slowly driving the vehicle away from the transformer. If the motor vehicle method is used, a dolly may be used to control the direction of the rodder and direct the rodder at as nearly as possible to a ninety degree angle from the transformer to the motor vehicle. If a rodder insertion machine is used to run the rodder through the high voltage conduit as described above, the rodder insertion machine may be reversed to extract the rodder from the high voltage conduit.

When the rodder reemerges from the duct funnel, still held in place by the transformer lid, the attached fiber optic micro duct can be detached from the rodder. At this point, the fiber optic micro duct is running from the first transformer to the second transformer through the high voltage conduit. Thereafter the duct funnel may be removed and the transformer closed, or the duct funnel may be moved to the other high voltage conduit of the transformer. Method 300 may then be repeated for the other high voltage conduit of the first transformer and the other high voltage conduit of the second transformer, as well as the high voltage conduits connecting all other transformers in the system, until fiber optic cable has been laid alongside all of the existing high voltage cabling.

After the completion of method 300, and as described in further detail below, the fiber optic micro duct may be run through the side of the transformer vaultpad, such as by drilling a hole, and thereafter run to a nearby fiber pedestal in order to allow direct fiber lines to be lain to residences in the subdivision.

Figure 4A:
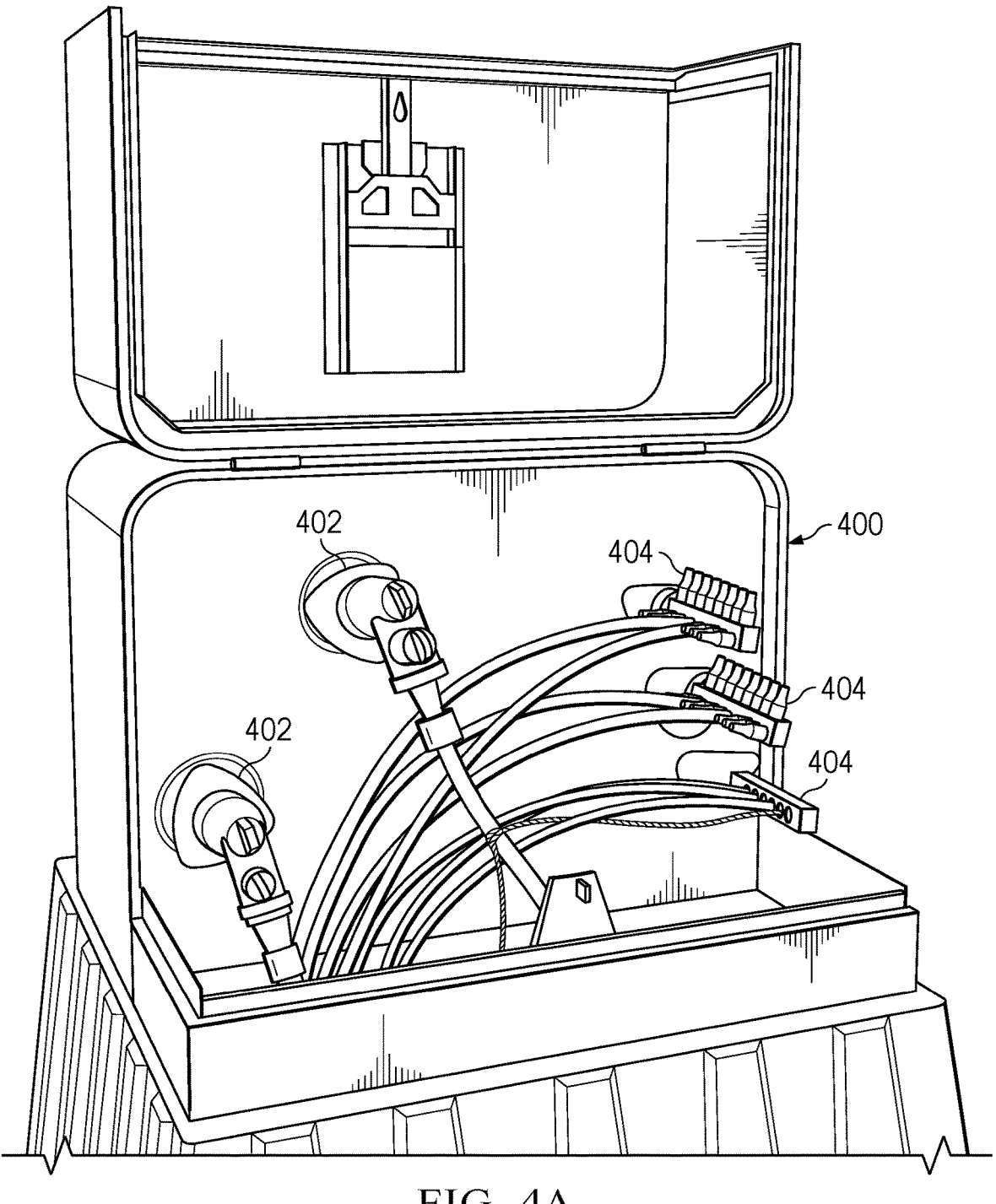
FIGS. 4A and 4B illustrate the inside of a transformer, according to an embodiment.
Figure 4B:
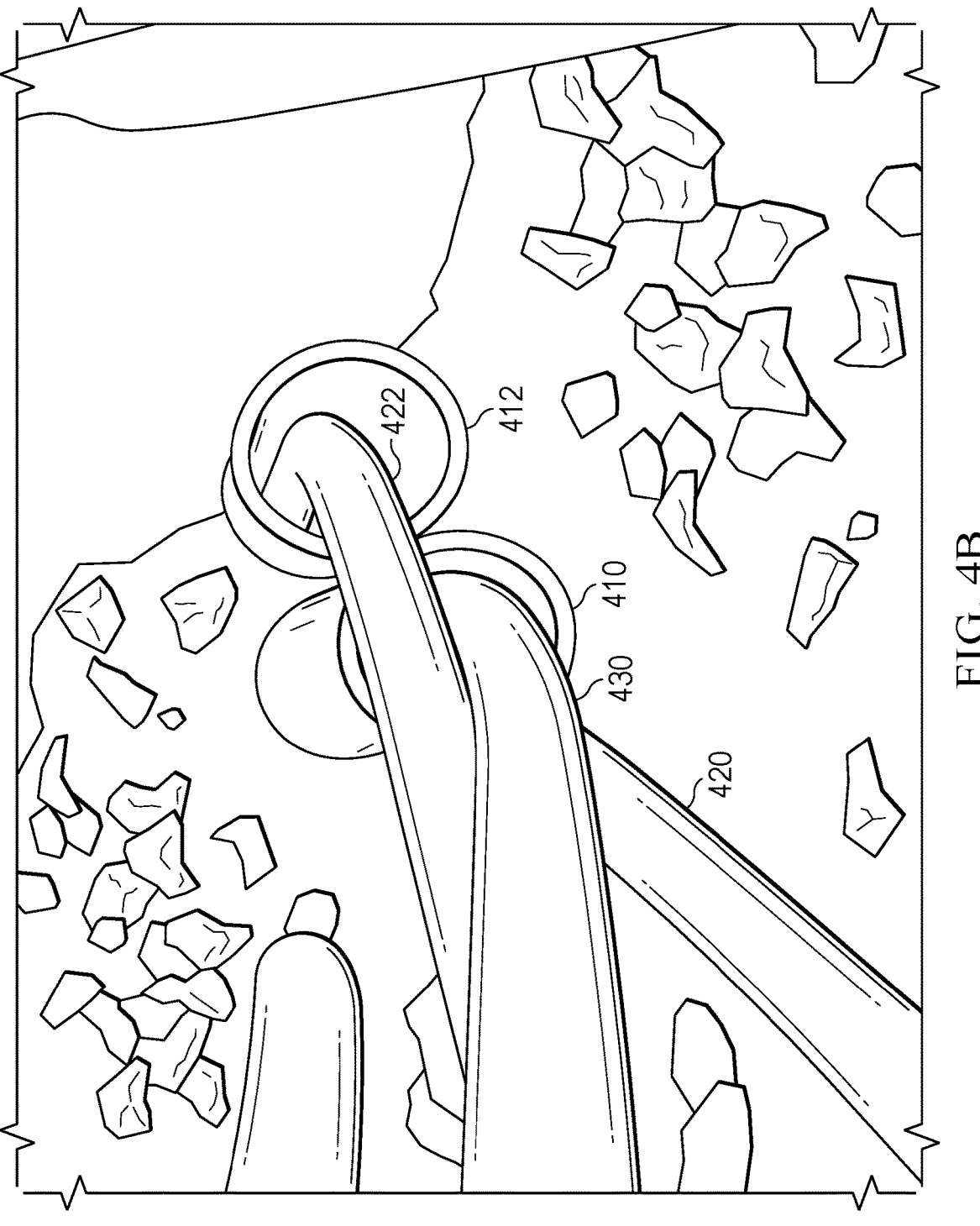

FIGS. 4A and 4B illustrate the inside of transformer 400, according to an embodiment. FIG. 4A shows the principal connections of transformer 400, with high voltage or primary connections 402 located on the left of transformer 400, one each heading in either direction according to the electrical layout, and secondary connections 404 located on the right of transformer 400. The number of secondary connections 404 may vary depending on transformer 404 and the subdivision, but typically secondary connections 404 may be used to provide electricity to residences connected to transformer 400.

FIG. 4B shows high voltage conduits 410 and 412 of transformer 400, with high voltage cables 420 and 422 running out of each conduit 410-412. In this example, fiber optic cable 430 has already been installed in leftmost conduit 410, according to embodiments described herein. Both high voltage conduits 410 and 412 are piping connecting the inside of transformer 400 to the insides of a subsequent transformer in line, one conduit running to a next transformer and the other running to a previous transformer. In this example high voltage conduits 410 and 412 are 3 inch diameter pipes, although larger or smaller diameter pipes may be used according to particular needs.

Figure 5A:
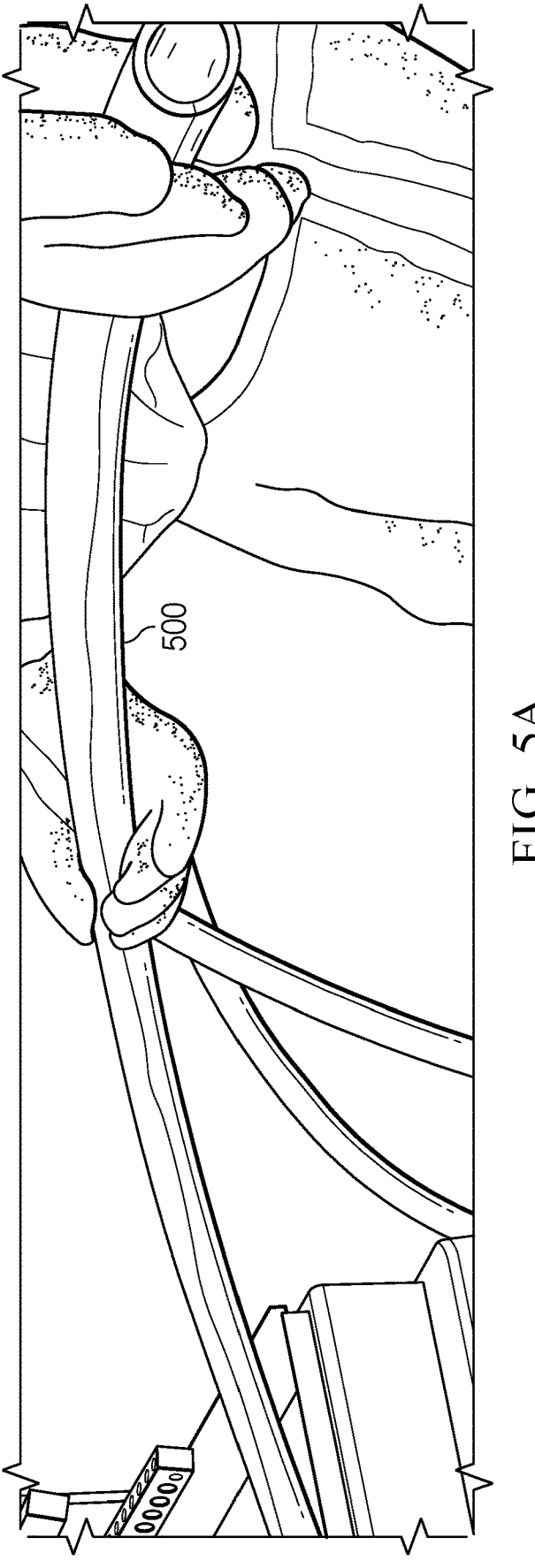
FIGS. 5A and 5B illustrate a duct funnel and the use thereof, according to an embodiment.
Figure 5B:
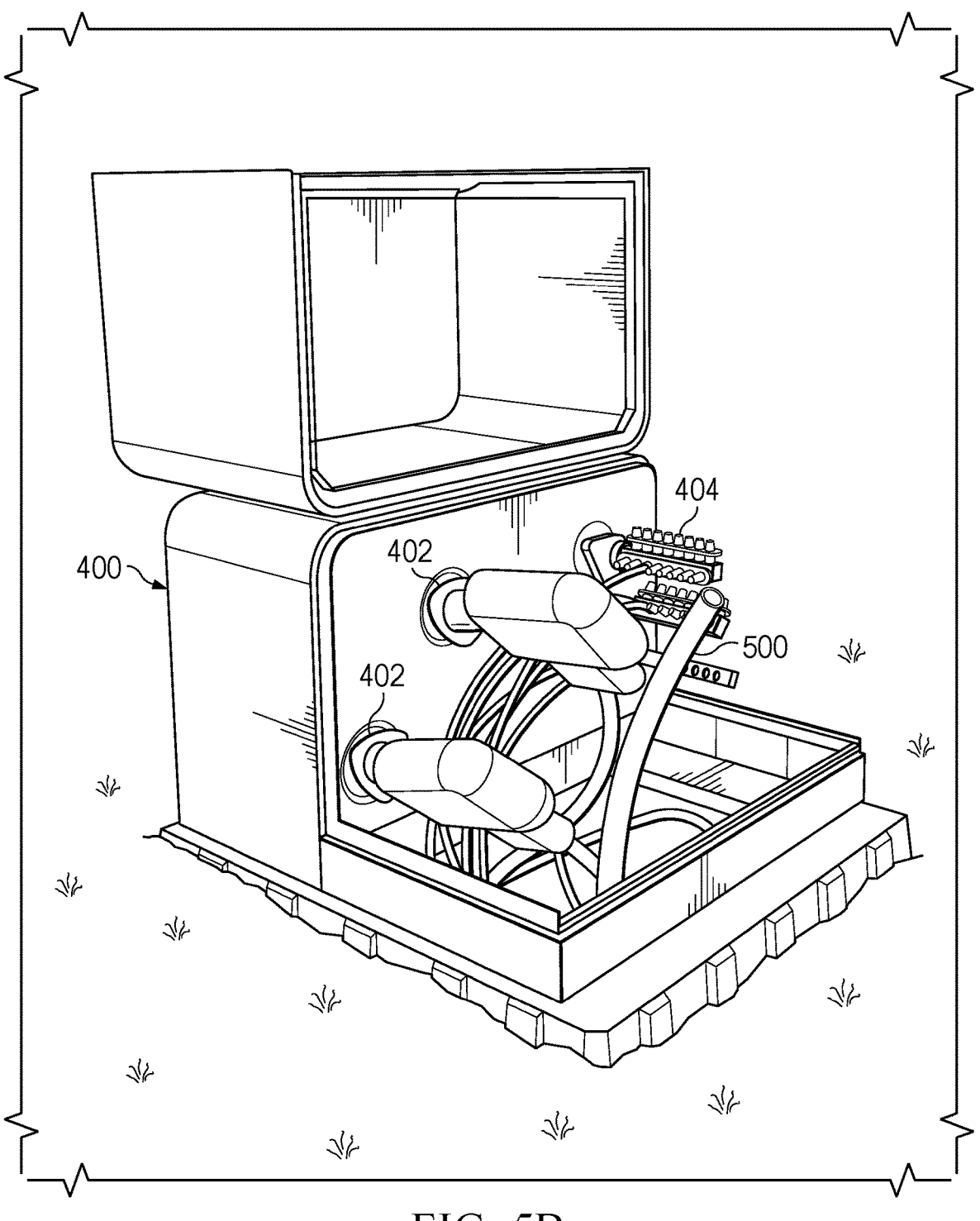

FIGS. 5A and 5B illustrate duct funnel 500 and the use thereof, according to an embodiment. FIG. 5A shows duct funnel 500 held by a worker in the process of placing duct funnel 500 within high voltage conduit 410. Duct funnel 500 must have an opening wide enough to accommodate a rodder or other tool to be used to lay or pull the fiber optic micro duct. In this example, duct funnel 500 is an approximately 4 foot long length of 1 inch diameter rolled conduit. The conduit has been cut at either end to slightly enlarge the opening to ease the passage of the rodder and the fiber optic micro duct.

FIG. 5B shows duct funnel 500 in place in high voltage conduit 410, sticking out of open transformer 400. In this example, additional protective equipment has been placed over primary connections 402 in order to further reduce the risk of any contact with the high voltage connections.

Figure 6A:
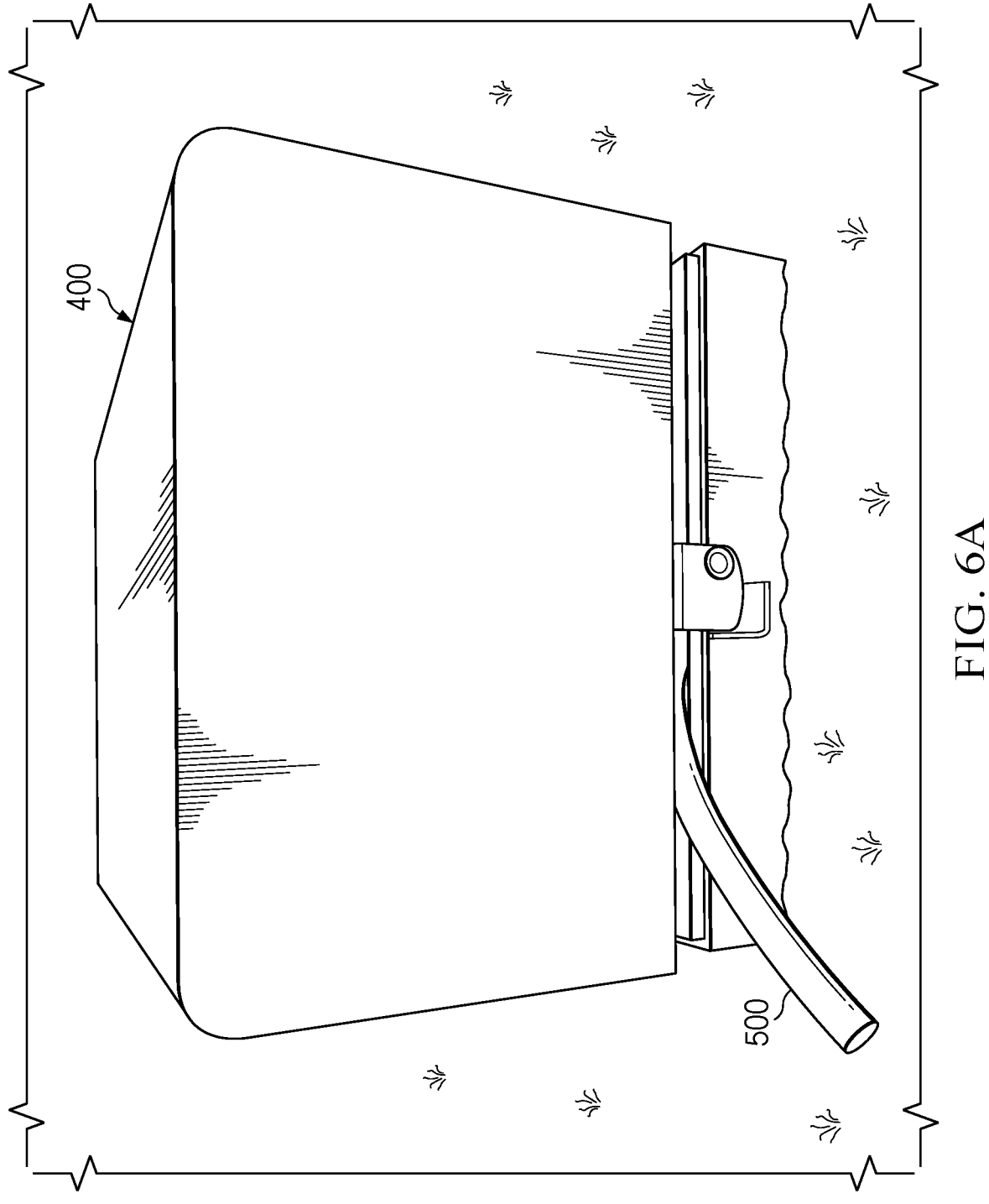
FIGS. 6A-D illustrate the process of placing a rodder down a duct funnel into a high voltage conduit, according to an embodiment.

FIGS. 6A-6D illustrate the process of placing rodder 600 down duct funnel 500 into high voltage conduit 410, according to an embodiment. FIG. 6A shows transformer 400 with lid closed, securing duct funnel 500 in place. As shown, approximately one foot of the end of duct funnel 500 is exposed with transformer 400 lid closed, and the opening is still accessible and usable. Closing the lid allows for a full path way to high voltage conduit 410, through duct funnel 500, while decreasing the risk of contact with high voltage primary connections 402 of transformer 400.

Figure 6B:
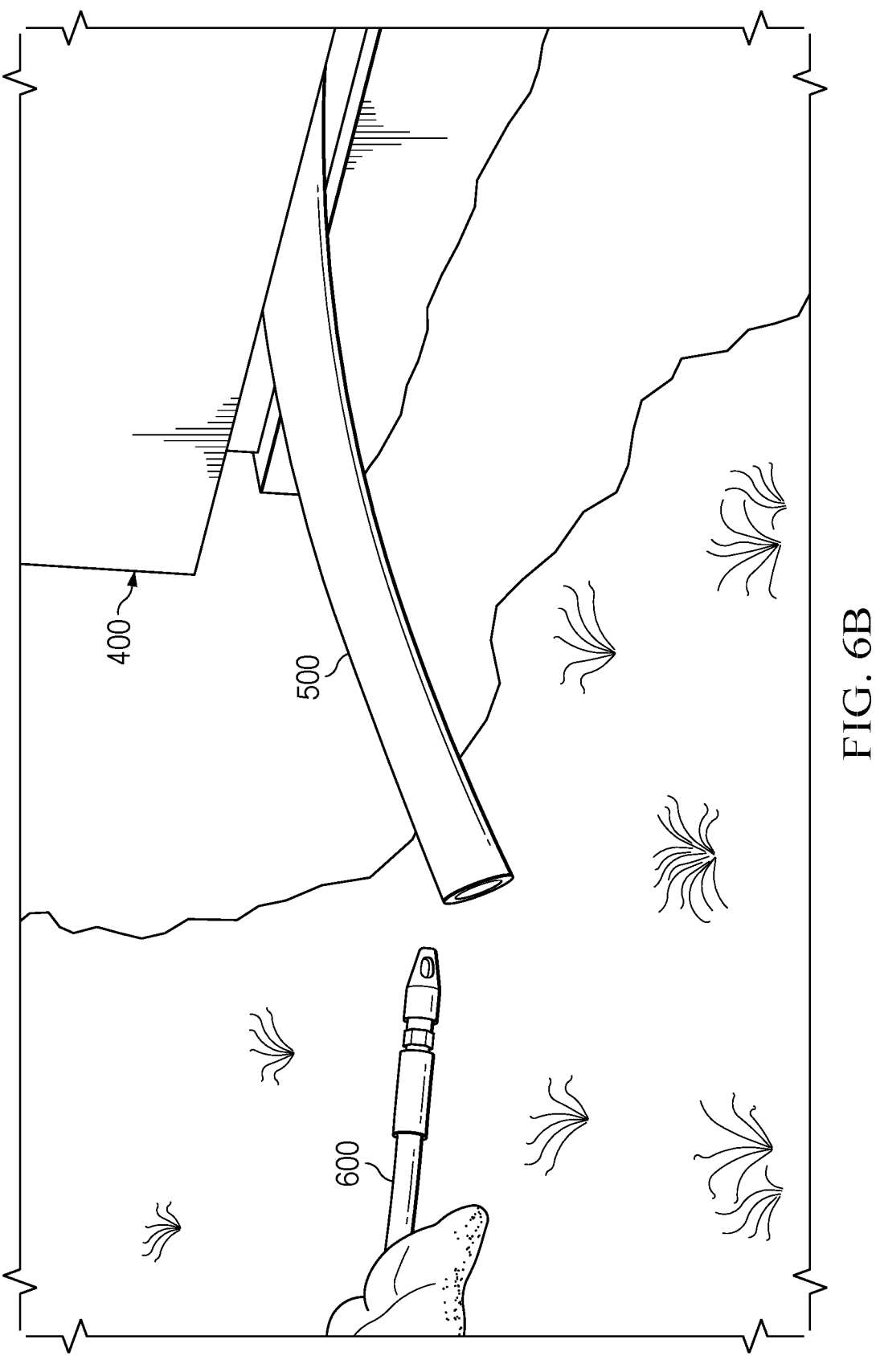
Figure 6C:
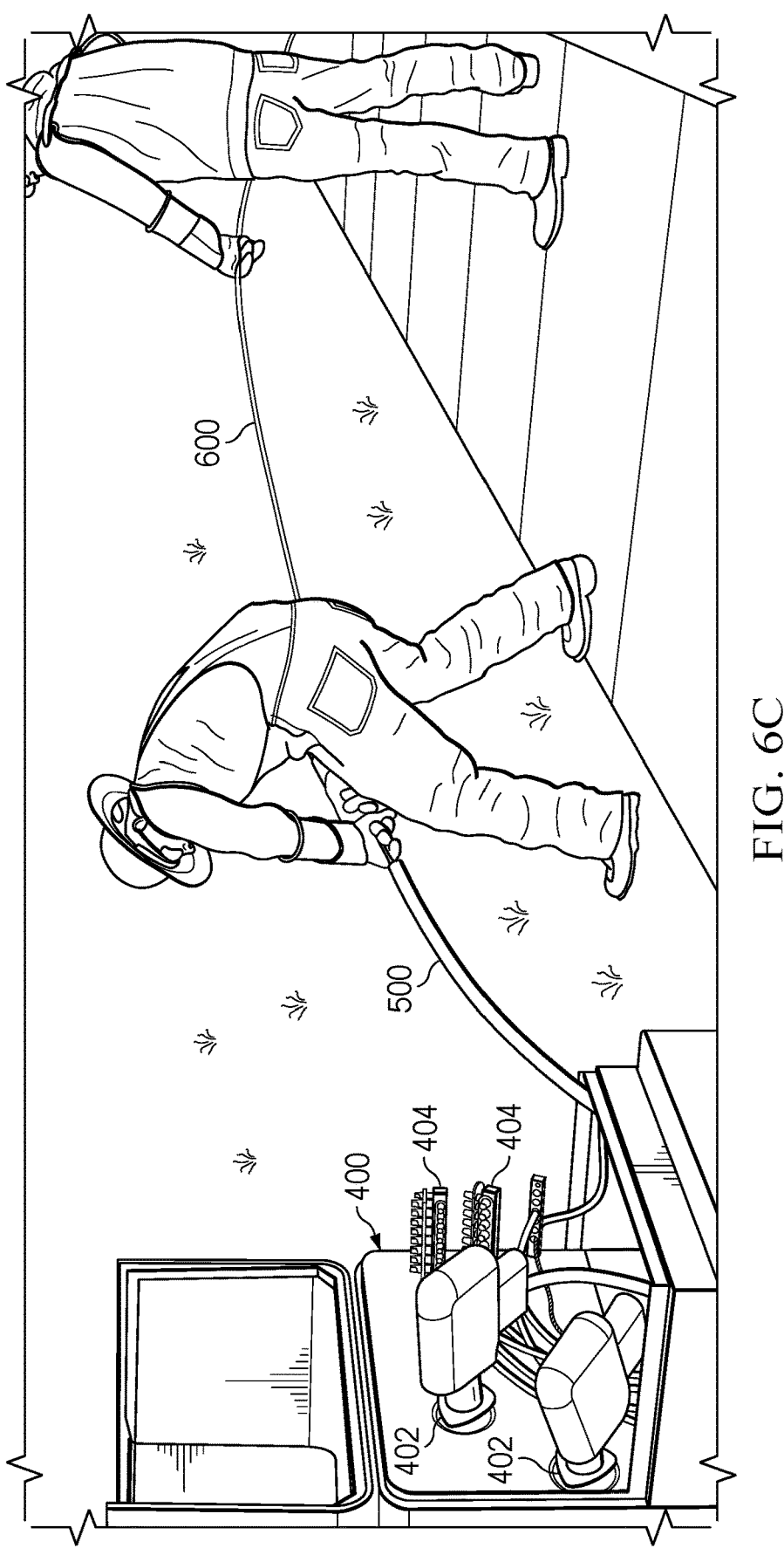

FIG. 6B shows the end of rodder 600 being inserted into the opening of duct funnel 500 left exposed after closing transformer 400 lid. FIG. 6C shows workmen manually sinking rodder 600 into duct funnel 500 and through duct funnel 500 into high voltage conduit 410. In embodiments, methods other than manual placing rodder 600 into duct funnel 500 may be used. In FIG. 6C transformer 400 lid is open to illustrate the activity better, though in other embodiments transformer 400 lid may remain closed throughout the process of the placing rodder 600 into high voltage conduit 410. In the example of FIG. 6C protection against contact with high voltage primary connections 402 is provided by protective covers.

Figure 6D:
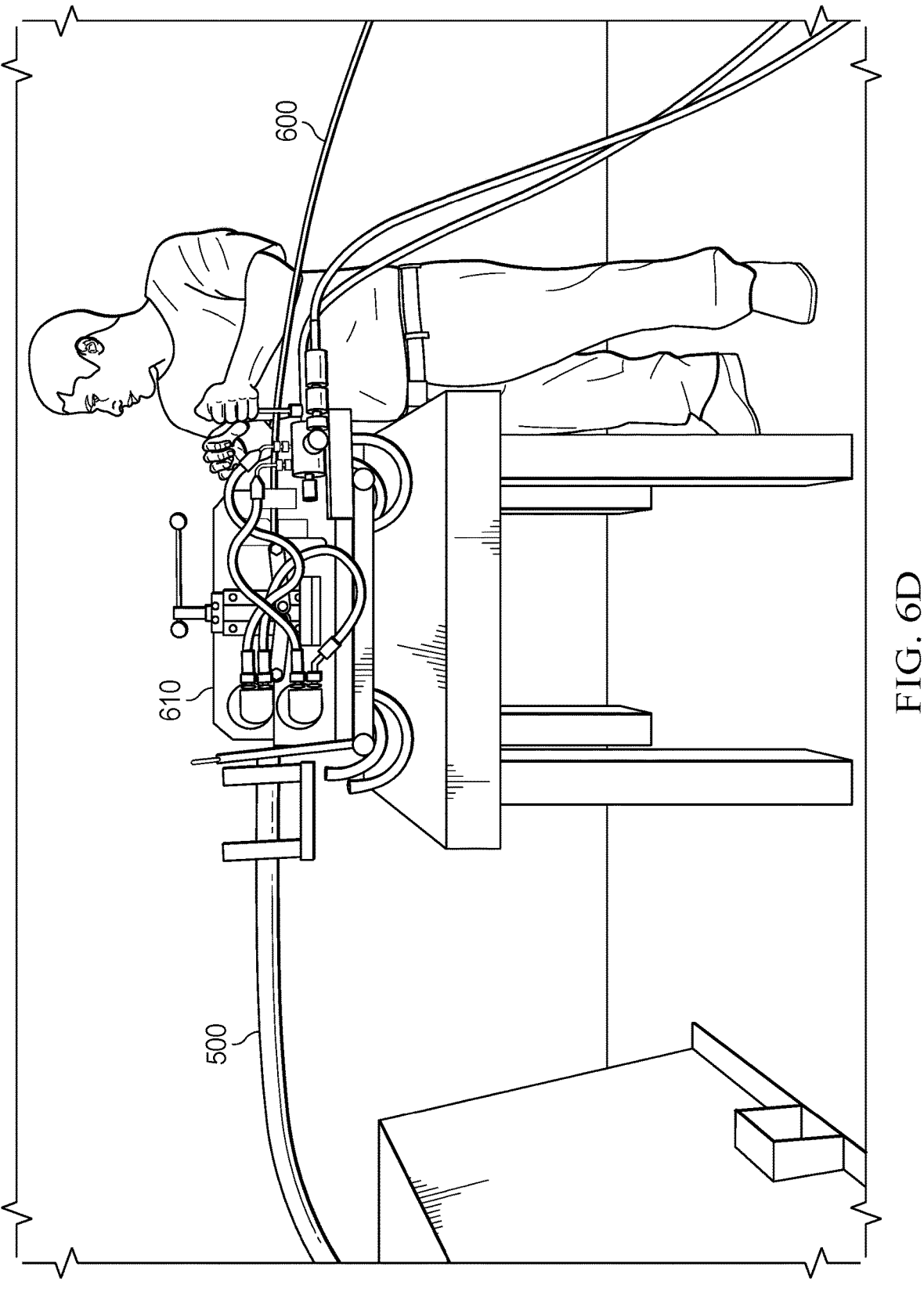

FIG. 6D illustrates rodder machine 610 which may be used to mechanically insert rodder 600 into high voltage conduit 410 and, later, to mechanically remove rodder 600 from high voltage conduit 410.

Figure 7A:
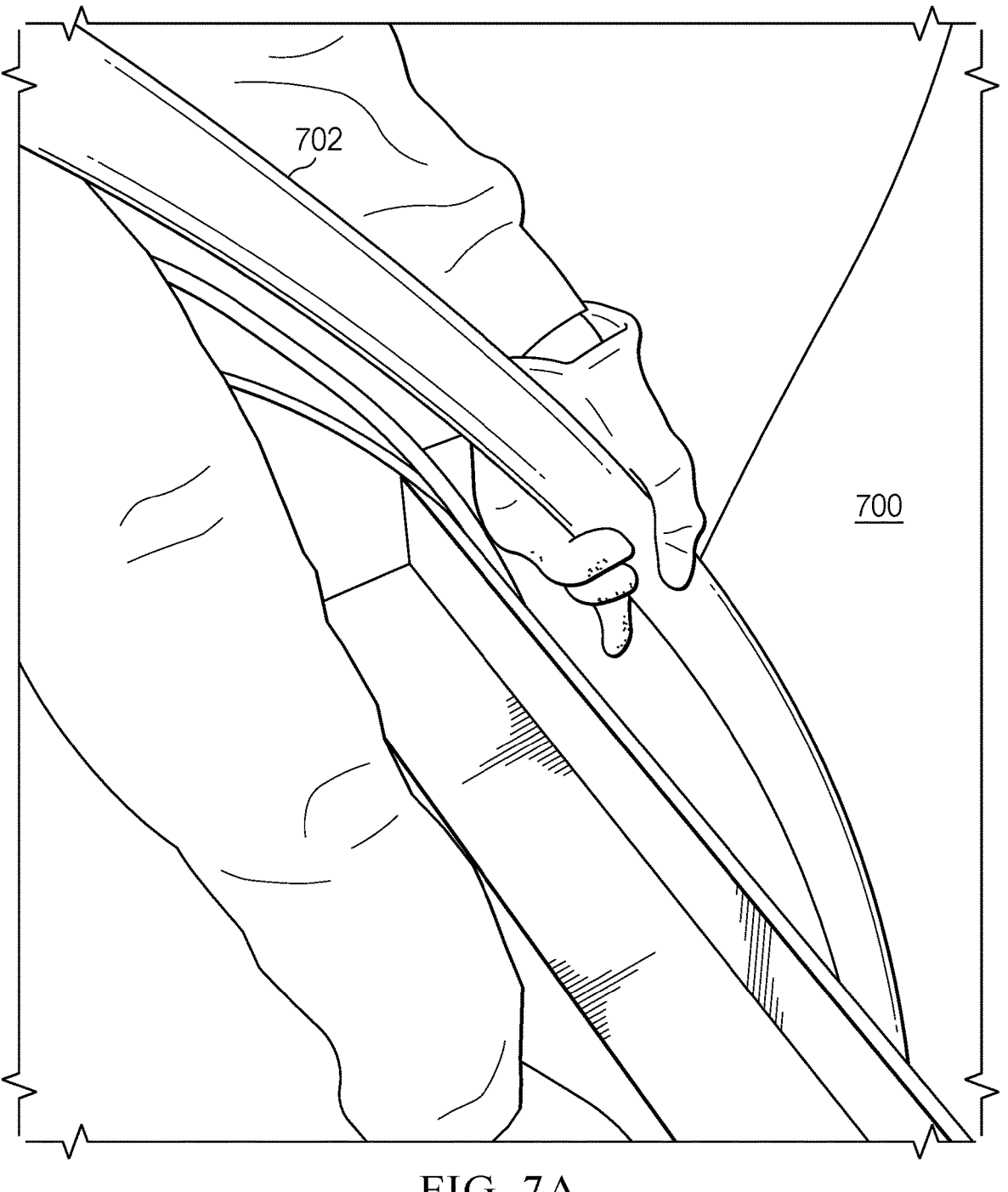
FIGS. 7A and 7B illustrate the process of placing a second duct funnel at a second transformer and attaching a rodder to a fiber optic micro duct, according to an embodiment.
Figure 7B:
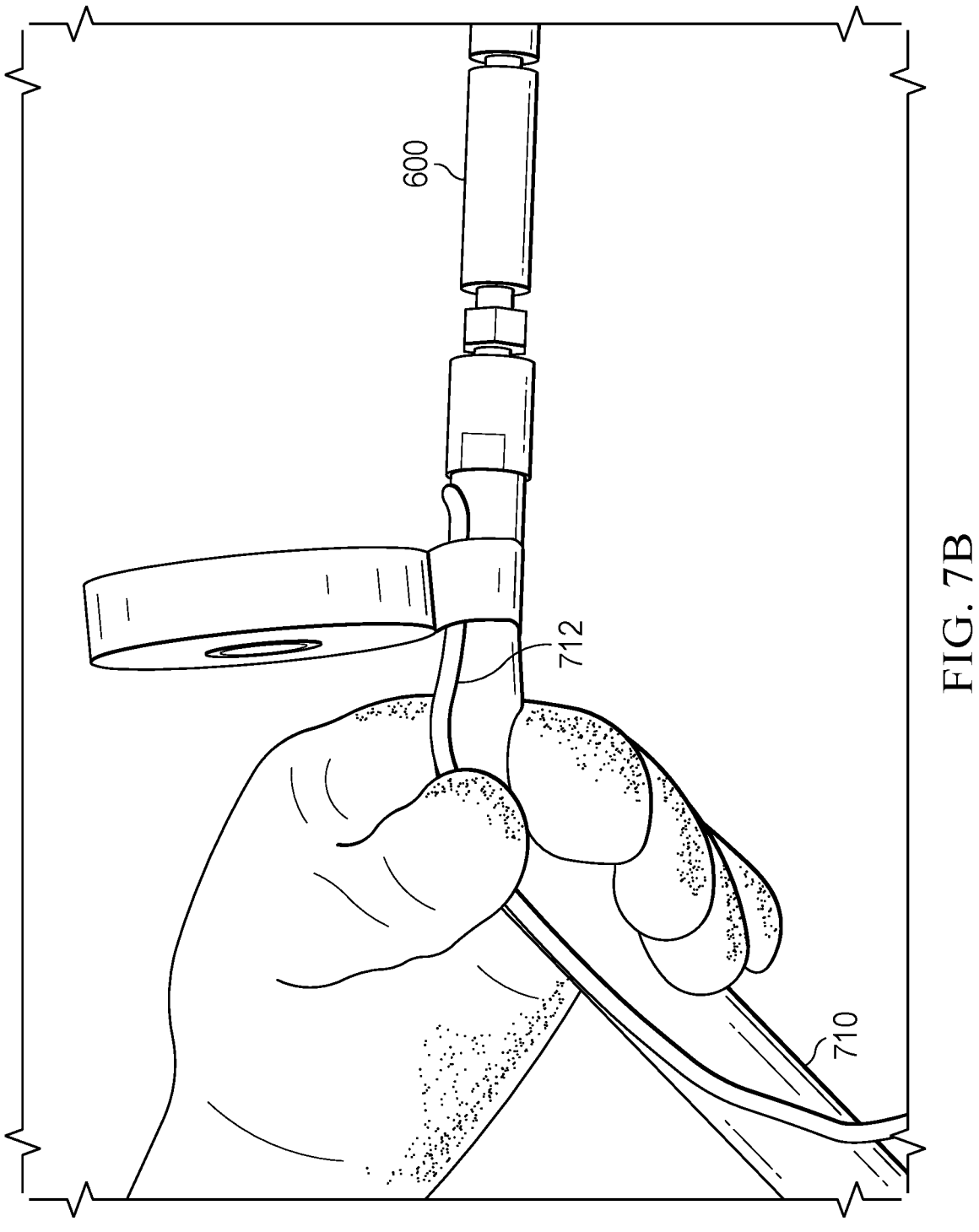

FIGS. 7A and 7B illustrate the process of placing a second duct funnel 702 at a second transformer 700 and attaching rodder 600 to fiber optic micro duct 710, according to an embodiment. FIG. 7A shows second duct funnel 702 being placed into high voltage conduit 410 opening at second transformer 700. In this situation, duct funnel 702 is placed around rodder 600, which has been pulled out of high voltage conduit 410 while simultaneously being pushed in at the other end of high voltage conduit 410. Because rodder 600 and fiber optic micro duct 710 will be returning through high voltage conduit 410, second duct funnel 702 is placed around rodder 600 before the connection between rodder 600 and fiber optic micro duct 710 is made. Not shown in FIGS. 7A-7B is that, after placing second duct funnel 702, the lid of second transformer 700 may be closed to prevent contact with high voltage primary connections of second transformer 700.

FIG. 7B shows rodder 600 being attached to fiber optic micro duct 710. In this example, rodder 600 and fiber optic micro duct 710 are connected using missile head 712. A missile head, also known as a tapered head fitting, is a connector that may be fitted to the end of rodder 600, enabling a pull line to be attached to rodder 600. In other embodiments, other connecters may be used to connect rodder 600 to fiber optic micro duct 710. In still other embodiments, rodder 600 may instead be attached a fiber optic cable directly rather than fiber optic micro duct 710. In FIG. 7B, the pull line from missile head 712 is tied to a holed connector attached to the end of fiber optic micro duct 710, and tied in place. Then, the pull line knot is further held in place by use of electrical or other tape. In other examples, a kellem grip or various other connectors may be used to attach rodder 600 to fiber optic micro duct 710, with or without the use of a pull line or tape. As described in further detail herein, a fiber optic cable without a micro duct may instead be attached to rodder 600 and pulled through high voltage conduit 410 as a wire-only installation.

Figure 8A:
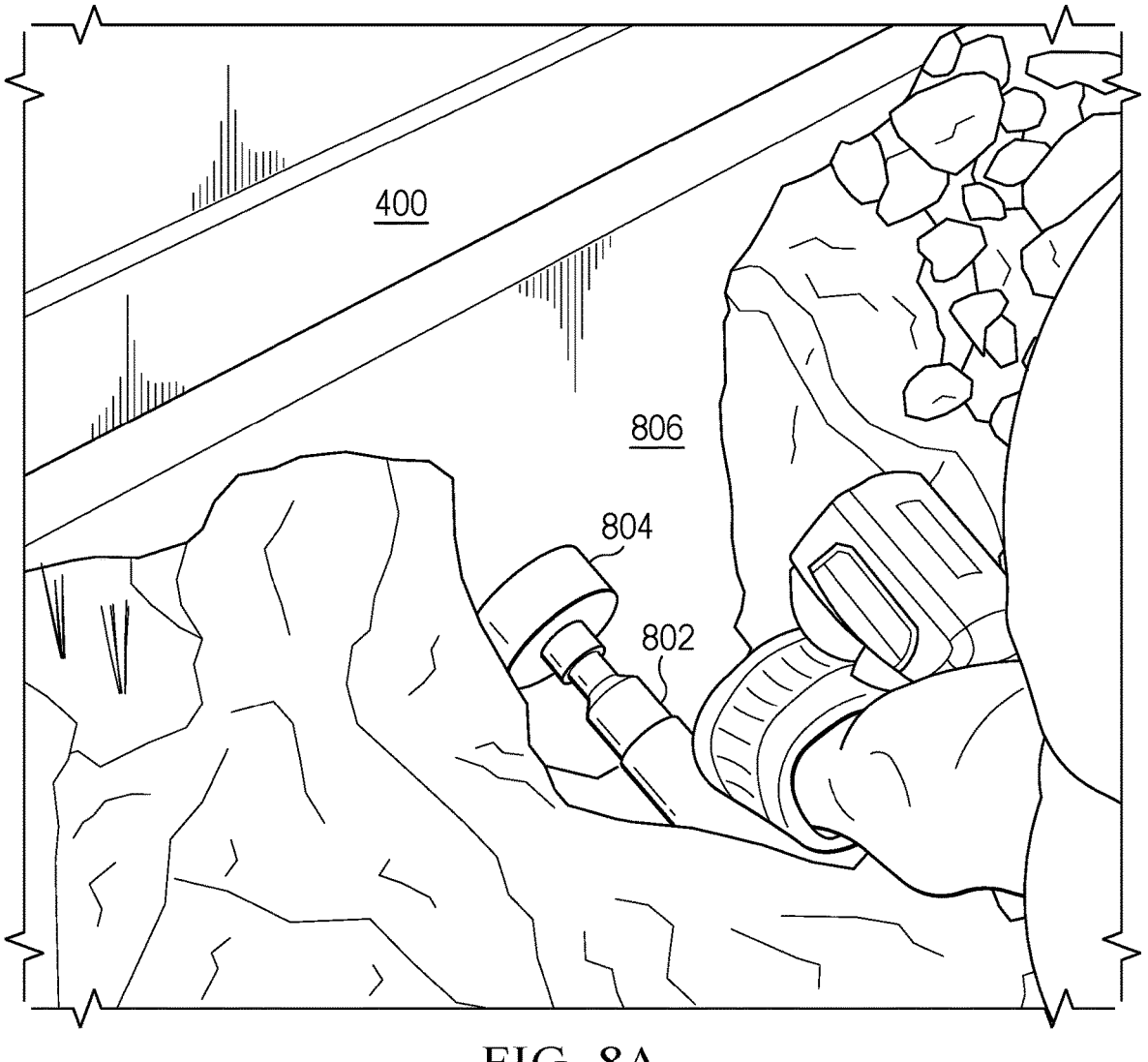
FIGS. 8A and 8B illustrate the process of drilling a hole to extend a fiber optic micro duct to a fiber pedestal or other secondary electrical box, according to an embodiment.
Figure 8B:
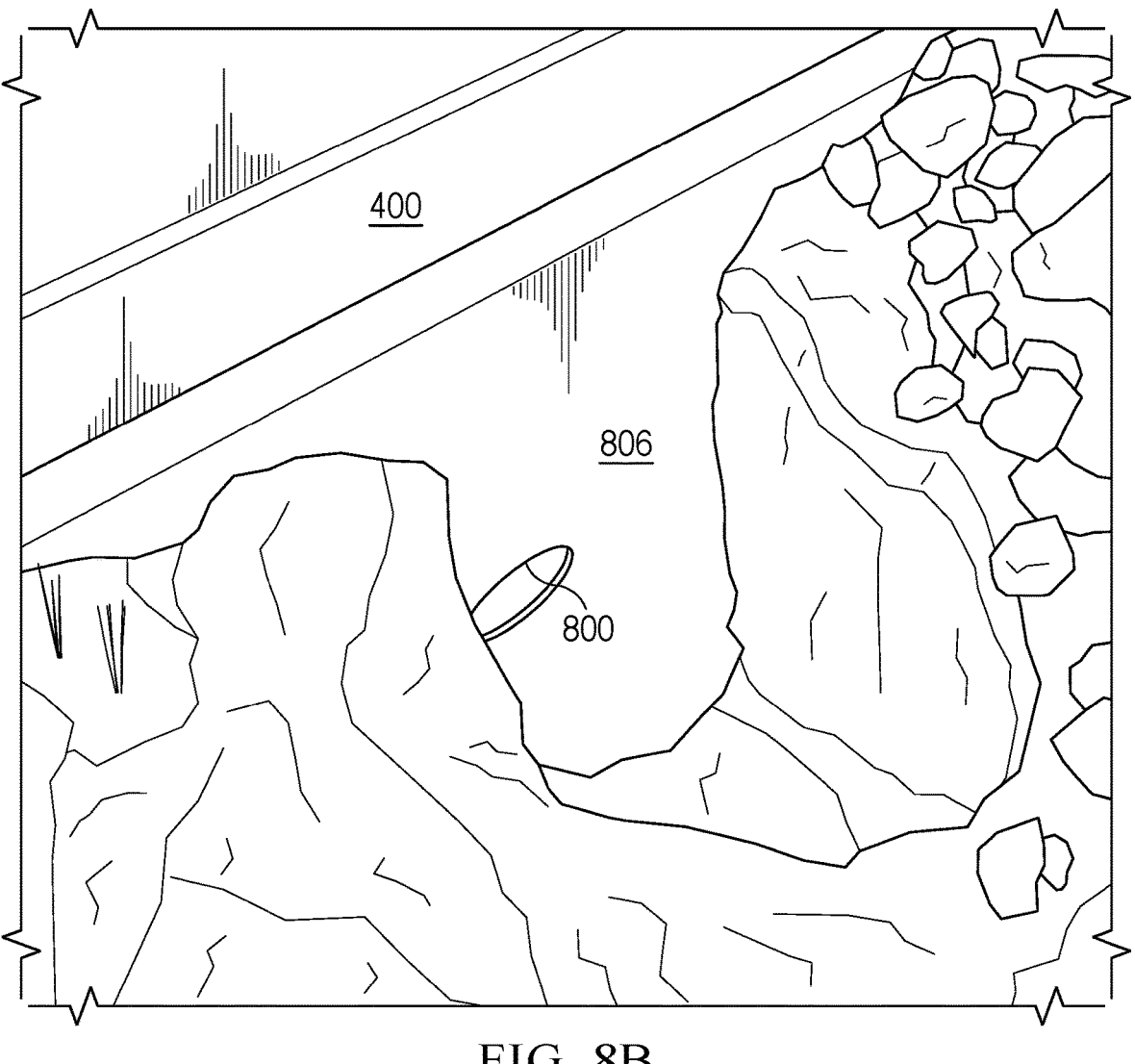

FIGS. 8A and 8B illustrate the process of drilling fiber hole 800 to extend fiber optic micro duct 710 to a fiber pedestal or other secondary electrical box, according to an embodiment. FIG. 8A shows a worker with battery powered hand drill 802 with hole drilling attachment 804 drilling at the rear wall of transformer 400 vaultpad 806. Prior to the situation shown in FIG. 8A, a hole may be dug in the ground to expose a sufficient portion of vaultpad 806 wall. In other examples, other tools such as a hole saw may be used to create fiber hole 800 into vaultpad 806 wall. FIG. 8B shows the completed fiber hole 800 after the drilling shown in FIG. 8A is completed.

Figure 9A:
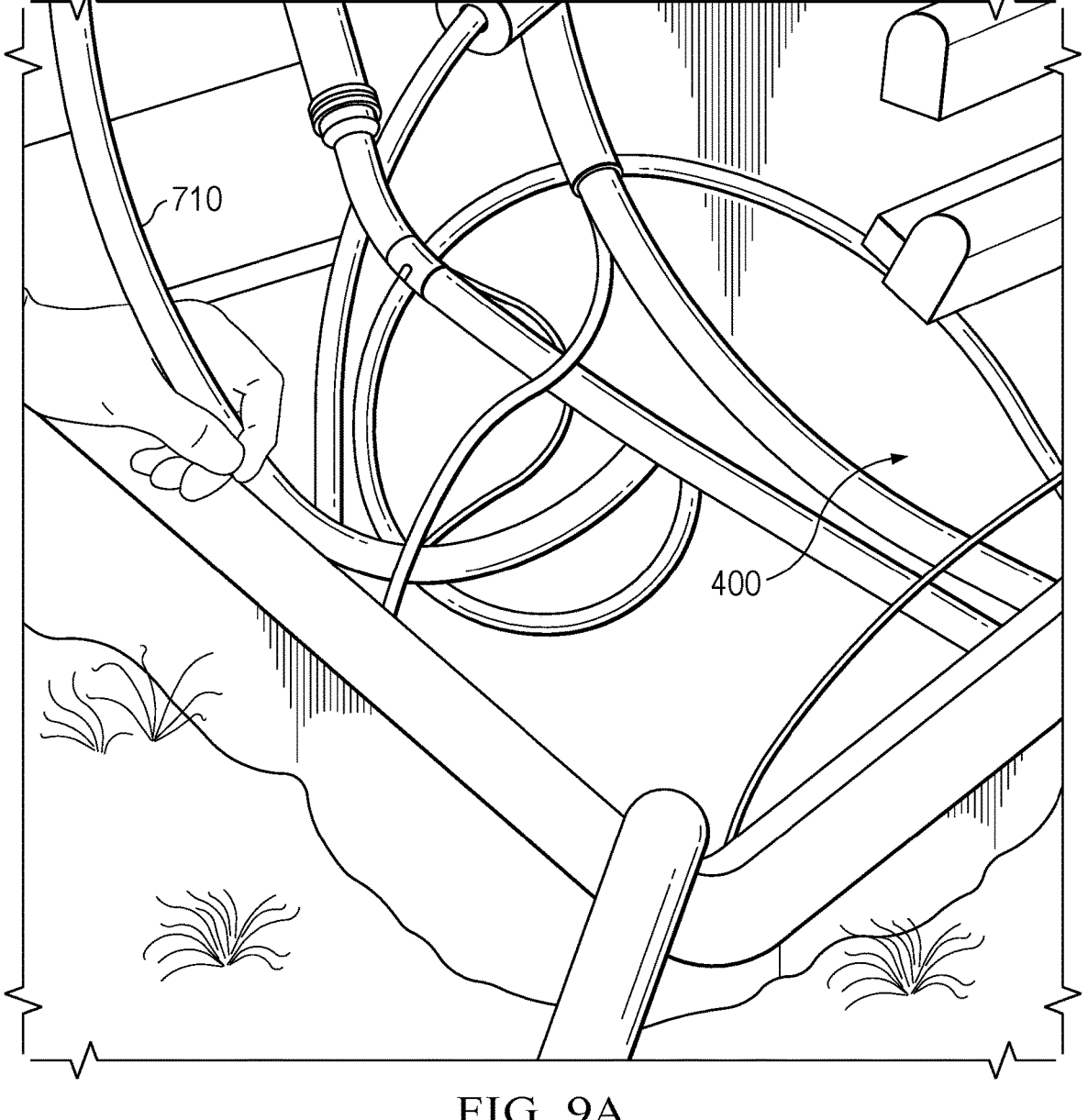
FIGS. 9A and 9B illustrate the process of placing a fiber optic micro duct through a wall of a transformer vaultpad, according to an embodiment.
Figure 9B:
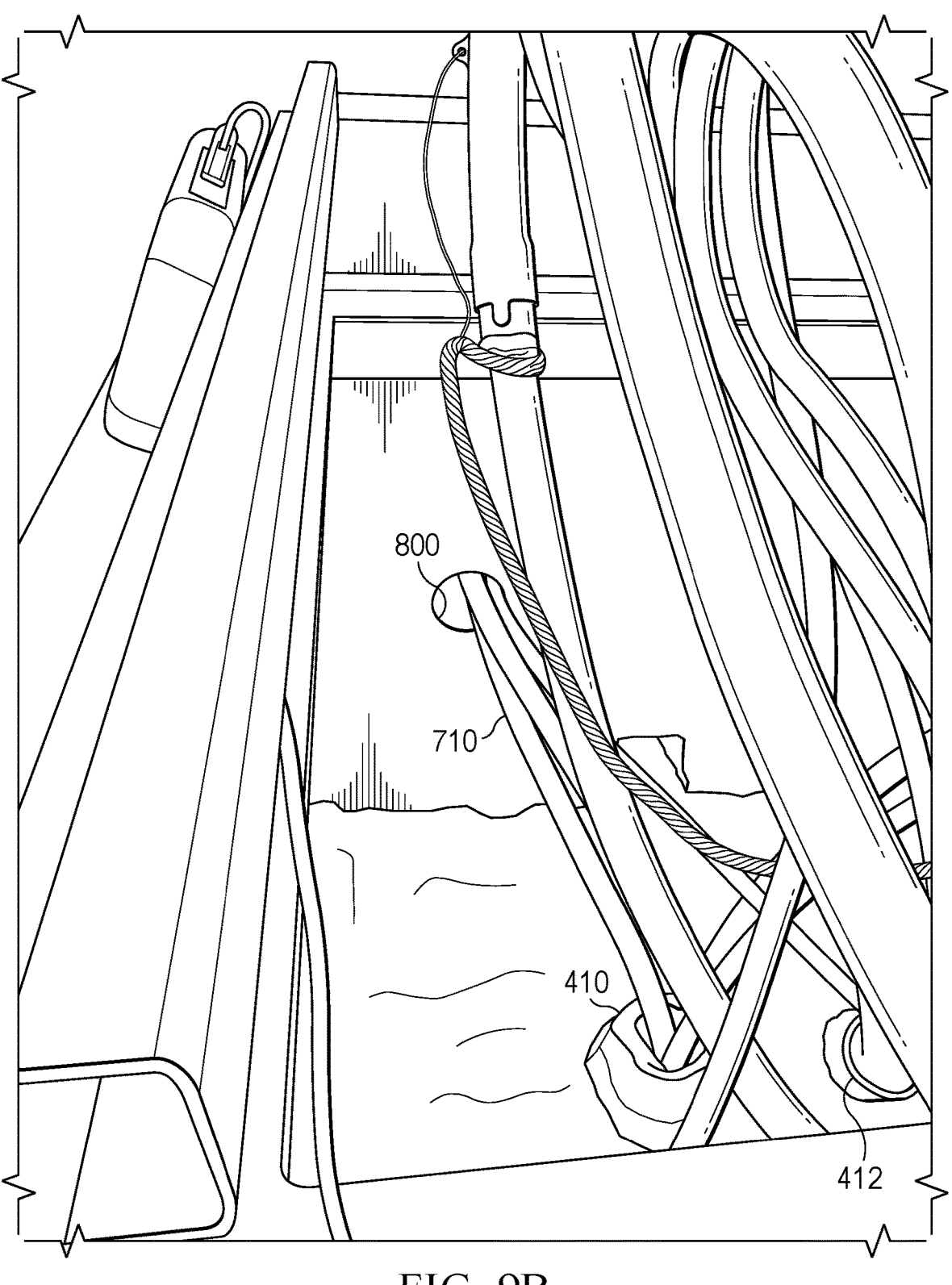

FIGS. 9A and 9B illustrate the process of placing fiber optic micro duct 710 through a wall of transformer vaultpad 806, according to an embodiment. FIG. 9A shows a worker running fiber optic micro duct 710 through fiber hole 800. In this example, fiber hole 800 has been drilled according to the process shown in FIGS. 8A-8B. FIG. 9B shows the completed process, where fiber optic micro duct 710 from both high voltage conduits 410-412 of transformer 400 has been run through fiber hole 800. In the example of FIG. 9B, fiber hole 800 is located in a side wall of transformer vaultpad 806 rather than the backwall as shown in FIGS. 8A-8B. In practice, any wall of transformer vaultpad 806 may be used depending on the particular orientation of transformer 400 relative to nearby secondary electrical boxes or fiber pedestals.

Figure 10:
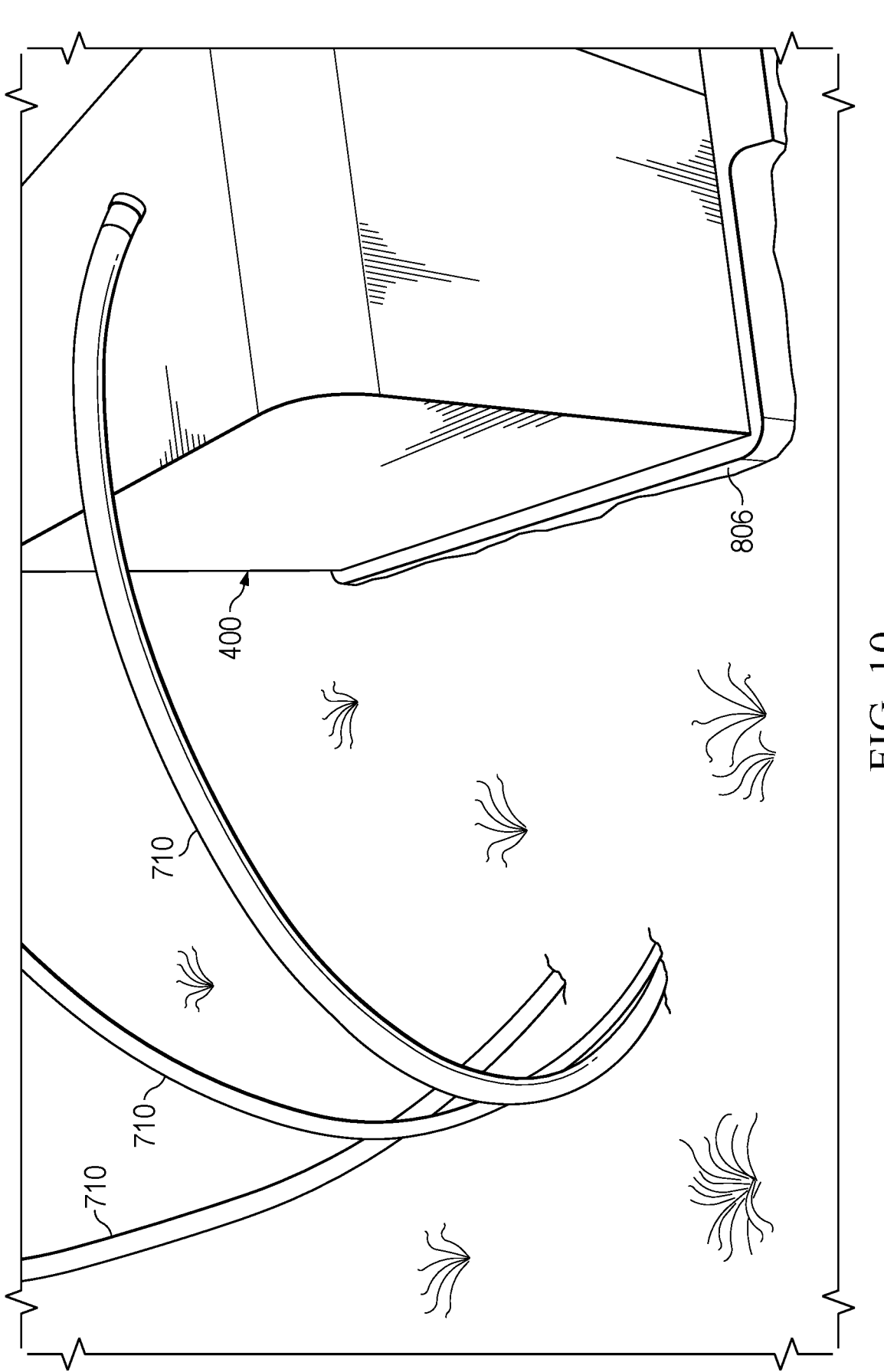
FIG. 10 illustrates a completed process for installing fiber optic cables using high voltage conduits, according to an embodiment.

FIG. 10 illustrates a completed process for installing fiber optic cables using high voltage conduits, according to an embodiment. FIG. 10 proceeds from the situation shown in FIGS. 9A-9B, following a back fill to cover the opening that was used to drill fiber hole 800 in transformer vaultpad 806 as shown in FIGS. 8A-8B. In FIG. 10, fiber optic micro ducts 710 have been stubbed pending their continuation to a nearby secondary electrical box or fiber pedestal. If the work is split into two different crews, this may allow for a second crew to use the stubbed fiber optic micro ducts to complete the connection to the secondary electrical box or fiber pedestal.

Figure 11:
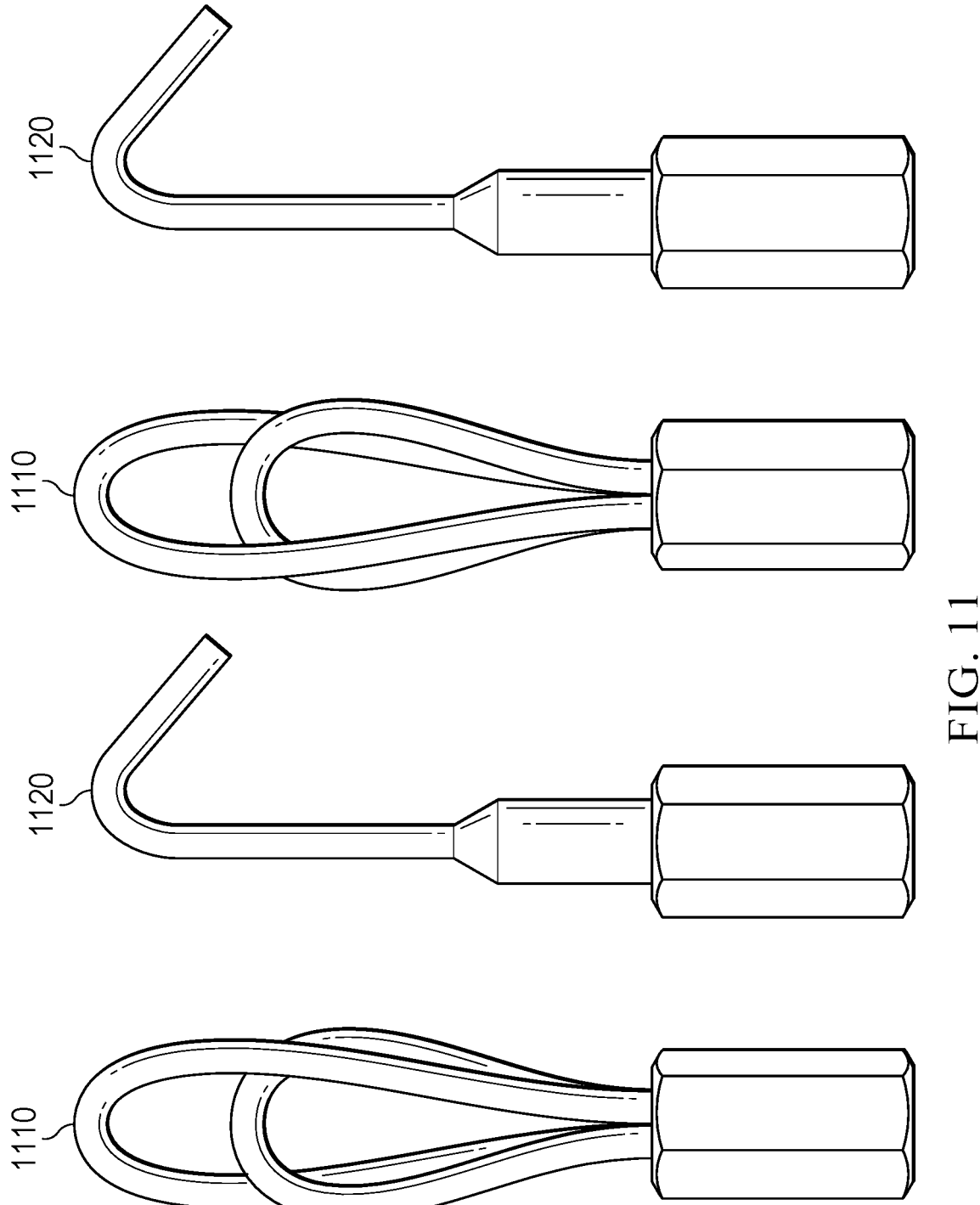
FIG. 11 illustrates exemplary rodder end attachments, according to an embodiment.

FIG. 11 illustrates exemplary rodder end attachments, according to an embodiment. In particular, FIG. 11 illustrates two loop attachments 1110 and two hook attachments 1120. In an exemplary embodiment, loop attachment 1110 comprises two metal loops fastened to an internally threaded fitting. The loops of loop attachment 1110 are attached to the internally threaded fitting in a substantially orthogonal arrangement to assist with the loop attachment being engaged, caught or snared by hook attachment 1120. In an exemplary embodiment, hook attachment 1120 comprises a metal hook for engaging, catching or snaring one or more of the loops of the loop attachment 1110. The loops of loop attachment 1110 and the hook of hook attachment 1120 may be attached to their respective threaded fittings by welding. Loop attachment 1110 and hook attachment 1120 may be attached to rodder 600 in the event that rodder 600, while traveling through high voltage conduit 410, gets hung up on a sweep or coupling. This may happen at the sweep at the end of a span of high voltage conduit 410, especially if the sweep is short, thus preventing rodder 600 from protruding from the end of the span.

In such a situation, loop attachment 1110 may be threaded onto the end of a first rodder when hung up. Then, hook attachment 1120 may be threaded onto a second rodder. Then, the second rodder will be inserted into the high voltage conduit that the first rodder is hung up on, from the opposite end of the high voltage conduit. Then, when the second rodder is pushed into the high voltage conduit, it will eventually meet the end of the first rodder, where hook attachment 1120 will catch onto, snare or engage loop attachment 1110 so that the connection of hook attachment 1120 and loop attachment 1110 is sufficient to withstand a pulling force of the second rodder. At this point, the first rodder can be pulled through the high voltage conduit by retracting the second rodder, using any of the retraction methods discussed in further detail above.

Figure 12:
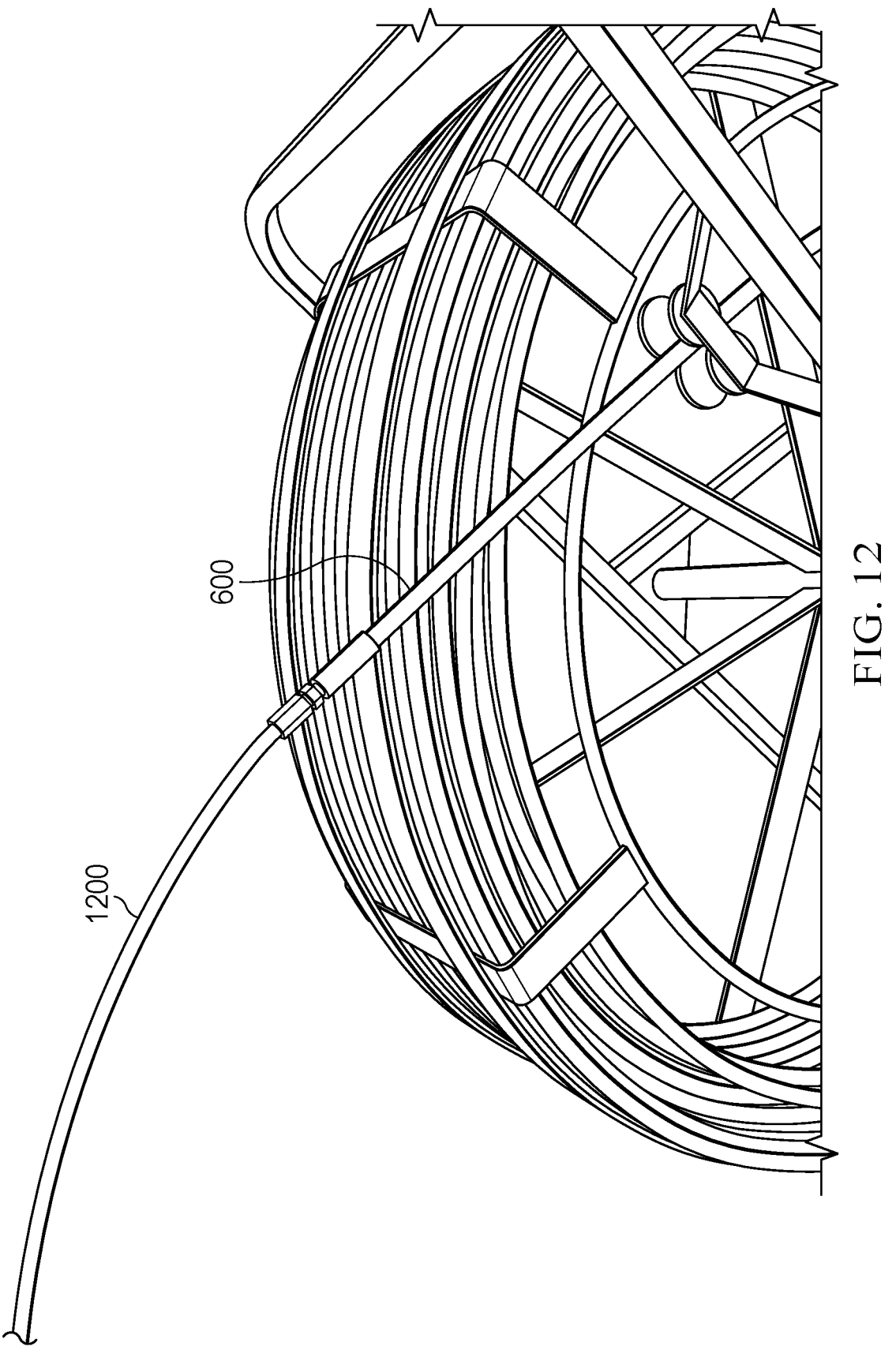
FIG. 12 illustrates an exemplary flexible rodder attachment, according to an embodiment.

FIG. 12 illustrates an exemplary flexible rodder attachment 1200, according to an embodiment. Flexible rodder attachment 1200 may be used to freely protrude through a span of a high voltage conduit that rodder 600 has difficulty traversing due to the rigidity of rodder 600. For example, if a span of a high voltage conduit has a short or tight sweep, flexible rodder attachment 1200 may be able to protrude from the span while rodder 600 cannot. Flexible rodder attachment 1200 may result in an increased success rate in pulling communication cables through short sweeps.

In an embodiment, flexible rodder attachment 1200 may be a 6 foot long polyethylene end, which is ¼ inch diameter. In a further embodiment, flexible rodder attachment 1200 may instead have a ⅜ inch diameter. Flexible rodder attachment 1200 may have threading so that it can be attached to an end of rodder 600.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A method for installing a communication cable in a high voltage conduit containing one or more energized high voltage cables, the method comprising:
   inserting a first duct funnel into the high voltage conduit at a first location, wherein the high voltage conduit carries the one or more energized high voltage cables to a second location;
   inserting a first duct rodder through the first duct funnel into the high voltage conduit;
   pushing the first duct rodder through the high voltage conduit towards the second location;
   in response to the first duct rodder being impeded in the high voltage conduit, retracting the first duct rodder and attaching a loop attachment to the first duct rodder;

reinserting the first duct rodder through the first duct funnel into the high voltage conduit;

inserting a second duct rodder through a second duct funnel into an opposite end of the high voltage conduit, the second duct rodder having a hook attachment;

engaging the hook attachment of the second duct rodder with the loop attachment of the first duct rodder;

retracting the second duct rodder from the high voltage conduit to pull the first duct rodder through the high voltage conduit;

attaching a communication cable to an end of the first duct rodder at the second location; and pulling the communication cable to the first location by retracting the first duct rodder and extracting the first duct rodder from the high voltage conduit.

2. The method of claim 1, wherein the hook attachment comprises an internally threaded fitting for attachment to the second duct rodder, and further comprises a single bent metal hook for engaging with the loop attachment.

3. The method of claim 2, wherein the loop attachment comprises an internally threaded fitting for attachment to the first duct rodder, and further comprises two bent metal loops for engaging with the hook attachment, wherein an opening of each bent metal loop is larger than a diameter of the hook of the hook attachment.

4. The method of claim 1, wherein the first location and the second location correspond to a first transformer box and a second transformer box.

5. The method of claim 1, wherein pulling the communication cable to the first location further comprises: manually pulling the first duct rodder, turning a coil wheel of the first duct rodder, or placing a base of the first duct rodder on a motor vehicle and driving the motor vehicle away from the first location.

6. The method of claim 1, further comprising:

drilling a hole in a side of a transformer vaultpad associated with the first location, the first location being located in a residential area;

laying the communication cable from the transformer vaultpad to a fiber pedestal; and laying one or more fiber lines from the fiber pedestal to one or more residences in the residential area.

7. The method of claim 1, wherein an inside diameter of the first duct funnel is larger than an outside diameter of the first duct rodder, and wherein an inside diameter at both ends of the first duct funnel is larger than an inside diameter of a middle section of the first duct funnel.

8. The method of claim 1, further comprising:

fitting an end of the first duct rodder with a tapered head fitting or a kellem grip for attaching the communication cable.

9. The method of claim 1, further comprising:

attaching the communication cable to the first duct rodder with a pull line.

10. The method of claim 1, wherein pulling the communication cable to the first location further comprises reversing a rodder insertion machine to extract the first duct rodder from the high voltage conduit.

*    *    *    *    *